Patented May 25, 1948

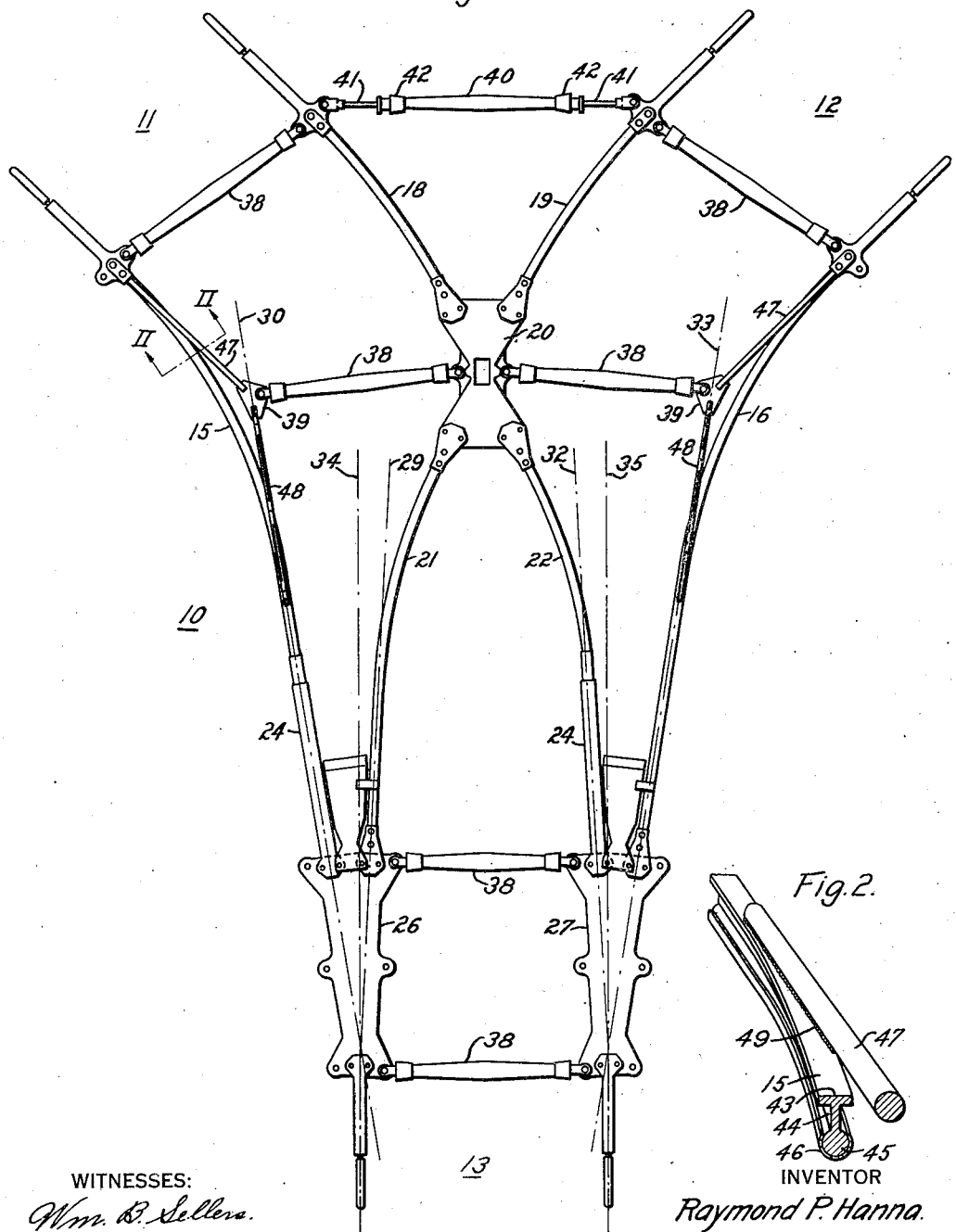

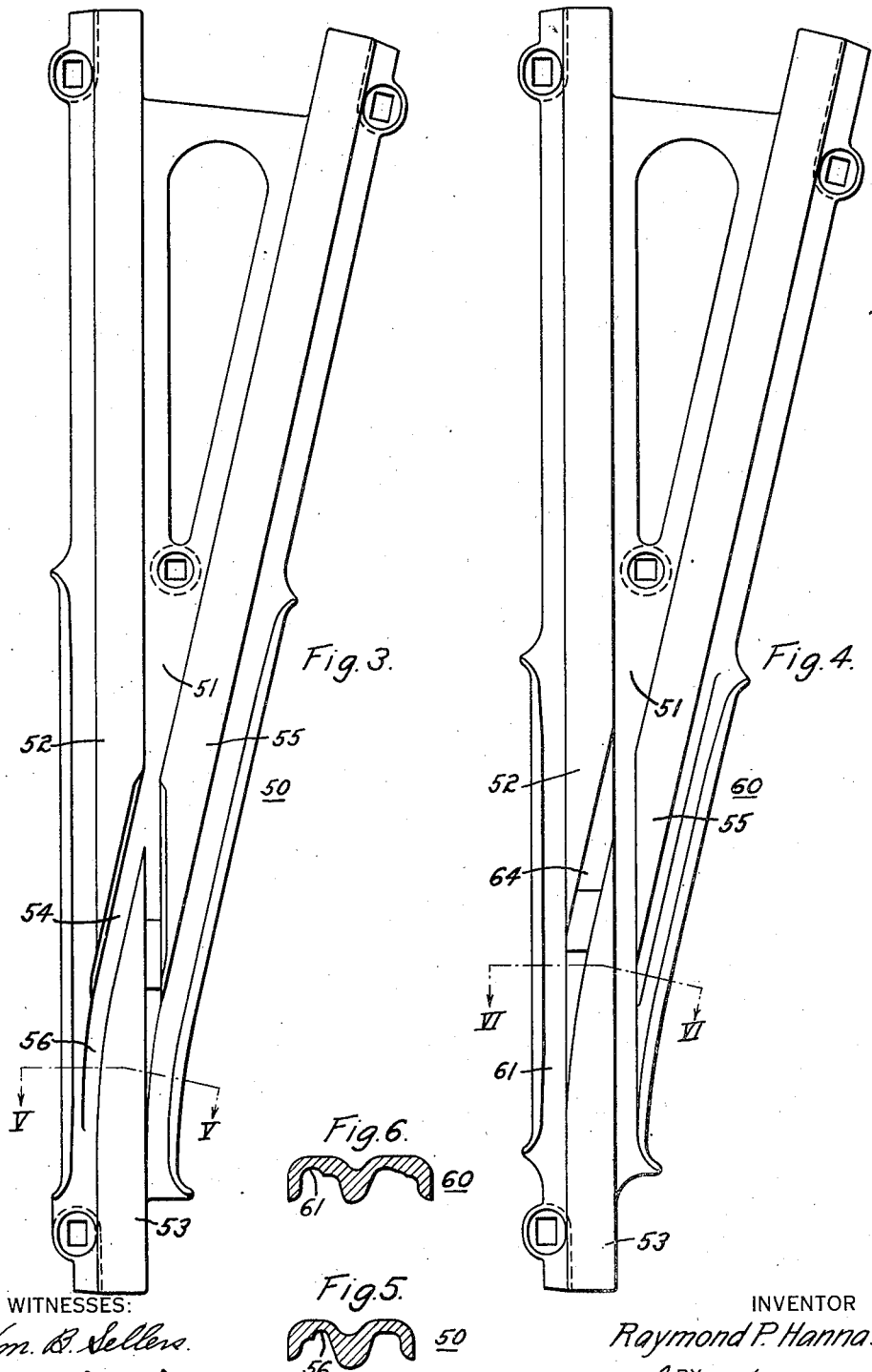

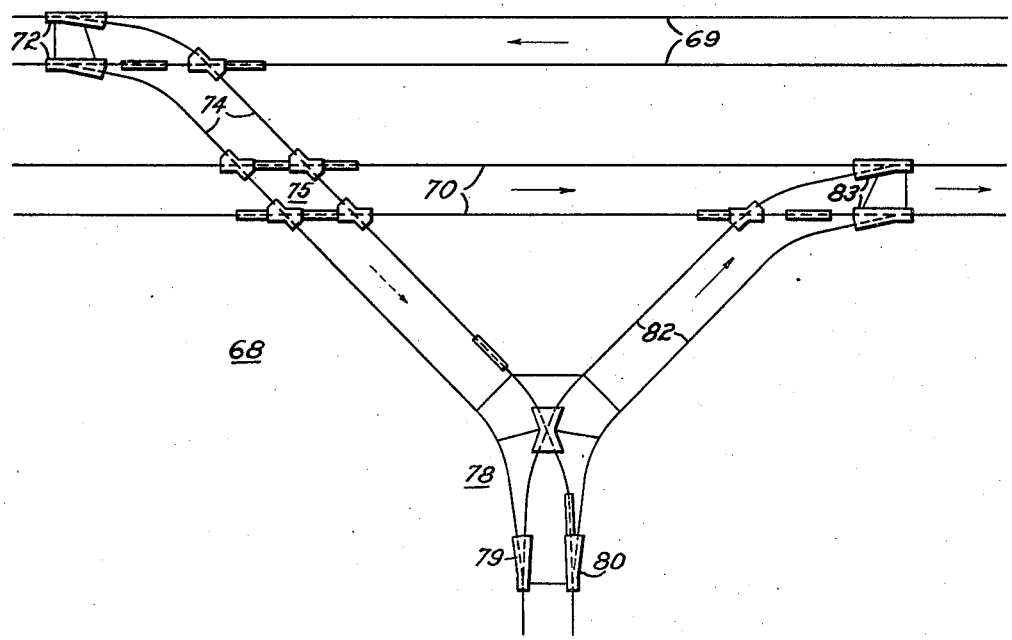
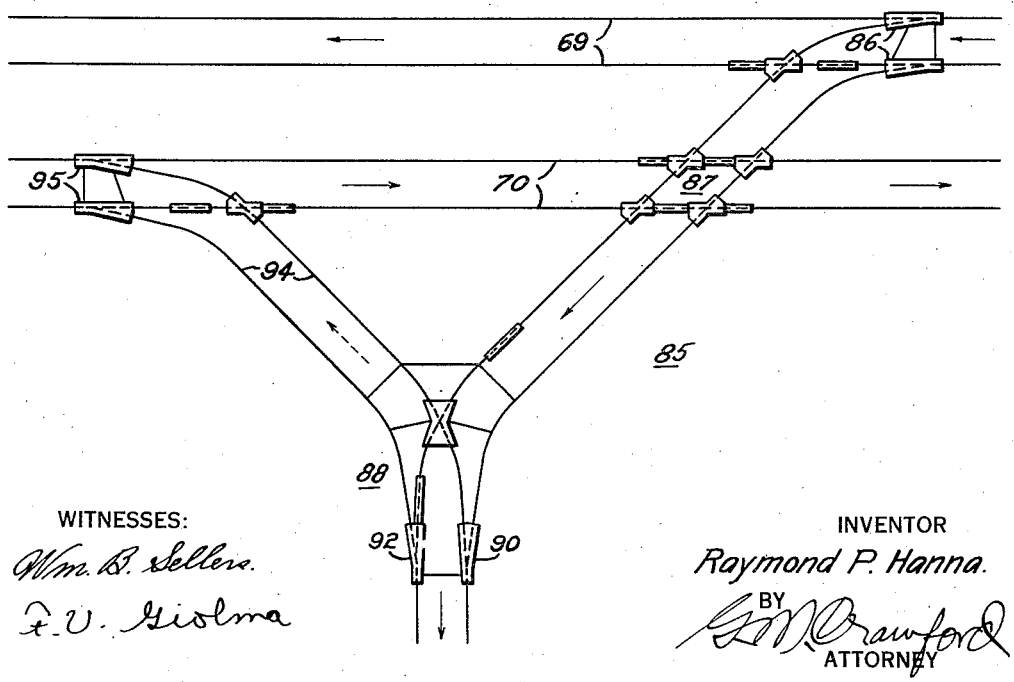

2,442,002

UNITED STATES PATENT OFFICE 2,442,002

Y TURNOUT FOR TROLLEY SYSTEMS

Raymond P. Hanna, Pittsburgh, Pa., assignor to Westinghouse Electric Corporation, East Pittsburgh, Pa., a corporation of Pennsylvania Application December 21, 1944, Serial No. 569,178

8 Claims. (Cl. 191—37)

My invention relates, generally, to trolley conductor systems, and has reference in particular to rigid constructions for overhead trolley conductor systems.

Generally stated, it is an object of my invention to provide an improved trolley conductor system which is simple and inexpensive to manufacture, and is reliable in operation.

More specifically, it is an object of my invention to provide for simplifying Y constructions in overhead trolley conductor systems by using combinations of right-hand and left-hand trolley frogs such as are commonly used at turnouts, instead of requiring special V or Y trolley frogs.

Another object of my invention is to provide for using different combinations of right-hand and left-hand trolley frogs for forming a plurality of different Y constructions by using a pair of frogs one of which is right-hand and the other of which is left-hand, and one of which takes preferentially to the branch runner and the other to the main runner.

Yet another object of my invention is to provide a simplified preferential overhead Y trolley conductor construction by using a right-hand trolley frog and left-hand trolley frog in paired relation with the main runners in the outer paths of the branches of the Y and inclined slightly toward each other in a direction from the stem of the Y, one of said frogs having the plate thereof grooved to guide a current collector along the main runner, while the other is grooved to guide a current collector along the branch runner.

Still another object of my invention is to provide a simple and rigid Y construction which is inexpensive to manufacture and easy to install.

A further object of my invention is to provide for using an adjustable compression member between the outer conductor sections of a Y intersection for facilitating installation and maintenance of the proper operating conditions of the construction in a trolley conductor system.

It is also an object of my invention to provide a simplified rigid curved conductor section for overhead trolley construction which permits supporting the section with a minimum of deformation of the curved section.

Other objects will in part be obvious, and will in part be described hereinafter.

According to my invention, a simple and economic turnout construction may be provided for overhead trolley bus conductor systems by using right-hand and left-hand trolley frogs of the type usually used in turnouts, for forming a Y construction. The trolley frogs are so positioned that the main runners are connected in the outside curve portions of the branches of the Y which are connected to a trolley crossing, and are inclined slightly toward each other. The branch runners are connected to rigid curved conductor sections forming the inside curve portions of the branches of the Y, and which are provided with pull-off means intermediate the ends connected adjacent the ends by tangential strain members. A rigid integral Y construction is provided by connecting the trolley frogs in spaced relation at each end by insulating members, by connecting the rigid curved sections in spaced relation to the trolley crossing by means of insulating members attached to the pull-off means, connecting the inner and outer sections of each branch adjacent the ends, and by connecting the outer curved sections of the branches of the Y to each other by means of an adjustable insulating member which provides a closed force system and provides for distributing the stresses in the structure as a whole when it is installed.

For a more complete understanding of the nature and scope of my invention, reference may be made to the following detailed description which may be studied in connection with the accompanying drawings, in which:

Figure 1 is a top plan view of a Y construction embodying the invention in one of its forms;

Fig. 2 is an enlarged sectional view of the rigid curved section taken along the line II—II of Fig. 1;

Fig. 3 is an enlarged bottom plan view of a left-hand trolley frog which may be used in a Y construction such as shown in Fig. 1, and which is grooved for taking to the curve;

Fig. 4 is an enlarged bottom plan view of a left-hand trolley frog which may be used in a Y construction such as shown in Fig. 1, and which is grooved for taking to the straight;

Fig. 5 is a sectional view taken along the line V—V of Fig. 3;

Fig. 6 is a sectional view taken along the line VI—VI of Fig. 4; and

Figs. 7 and 8 are diagrammatical views of trolley conductor systems embodying the invention in different forms.

Referring to Fig. 1, the reference numeral 10 may denote, generally, a Y construction for trolley conductor systems having branch portions 11 and 12 intersecting at a common point with a stem portion 13, and disposed substantially symmetrically with respect to the stem portion.

The Y construction 10 may, for example, comprise a pair of rigid curved conductor sections 15 and 16, which form the inner curve portions of the two curved branches 11 and 12. The outer curve conductor portions of the two branches may comprise curved metallic spacers 18 and 19 which extend outwardly from a trolley crossing 20, and additional curved sections 21 and 22 which extend from the trolley crossing 20 toward the intersection and the stem portion 13. Means such as the insulating portions or section insulators 24 may be provided in connection with the sections 15 and 22 for insulating the conductors of opposite polarity.

In order to provide an intersection between the curved branch sections 11 and 12 and the stem section 13 of the Y, means such as the trolley frogs 26 and 27 may be used. Instead of utilizing either V or Y trolley frogs of special designs, as heretofore, I have found that an extremely inexpensive and effective Y construction may be obtained by using different combinations of left-hand and right-hand trolley frogs of the usual design such as used in turnouts. Accordingly, in line with the usual designations of trolley frogs, the trolley frog 26 may be a left-hand trolley frog, having a main runner on the lower side, the longitudinal axis of which is represented by the dot-dash line 29, and a branch runner, the longitudinal axis of which may be designated by the dot-dash line 30. The trolley frog 27 may be a right-hand trolley frog, having a main runner, the axis of which may be represented by the dot-dash line 32, and a branch runner, the longitudinal axis of which may be represented by the dot-dash line 33. The dot-dash lines 34 and 35 represent the longitudinal axes of the conductor of the stem portion 13, and are parallel to the central axis of the Y. Accordingly, it will be seen that the trolley frogs 26 and 27 are positioned with the main runners in line with the outer curved portions of the branches of the Y, and inclined inwardly toward each other in a direction through the Y from the stem end. For example, the main runners may be inclined inwardly on the order of 1 to 5 degrees for the best operating conditions.

In order to provide a substantially rigid Y construction which may be readily installed as a unit, the trolley frogs 26 and 27 may be connected in predetermined spaced relation at the opposite ends by insulating members 38, so that the main runners are inclined inwardly toward each other as hereinbefore described. The curved sections 15 and 16 may be integrated with the Y construction by connecting them intermediate the ends to the trolley crossing 20 by means of insulating members 38, which may be connected to pull-off means 39. Additional insulating members 38 may be used to connect the outer ends of the curved sections 15 and 16 to the curved spacers 18 and 19, so as to maintain them in predetermined spaced relation. A substantially closed box construction having a closed force-figure may be provided by connecting the outer ends of the curved sections 18 and 19 to each other by insulating means 40. In order to provide for readily adjusting the Y construction so as to equalize the stresses applied thereto when it is installed, and insure alinement of the different conductor sections, the insulating member 40 is preferably adjustable, having end portions 41 which may be threadedly adjustable relative to the end members 42.

Referring to Figs. 1 and 2, it will be seen that the rigid curve sections 15 and 16 may each comprise a substantially T-shaped bar having a horizontal flange 43 with a dependent web 44, which may be provided with a beaded lower edge 45 for guiding a current collector. If desired, suitable armor, such as the U-shaped copper sheath 46, may be applied to the lower edge of the bar to improve the wearing characteristics thereof.

In order to provide a substantially rigid Y construction without tending to deform the predetermined curve of the curved section, means such as the pull-off plate 39 may be provided. The pull-off plate 39 may be positioned on the convex side of the bar to provide a connection point for a pair of strain rods 47 and 48, which may be connected adjacent the ends of the bar in tangential relation by any suitable means such as the welds 49. By connecting the insulating members 38 to the pull-off plate 39, the curved sections may be so integrated with the Y construction that a minimum of stress tending to deform the bar is applied to the curved conductor bar.

In Figs. 3 through 6, trolley frogs of types such as may be used in Y constructions are shown. They may be of different designs depending upon what operating result is desired. For example, as shown in Figs. 3 and 5, the left-hand trolley frog 50 may comprise a plate portion 51 having thereon a substantially straight main runner composed of sections 52 and 53 having a diagonal groove 54 therebetween. Adjacent the diagonal groove 54 a turnout or branch runner 55 may be positioned on the left-hand side, when viewed from the top. In order to give a preference for guiding a current collector proceeding from the common or lower end 53 of the main runner to the curved or branch runner 55, the plate 51 may be grooved. For example, as shown in Figs. 3 and 5, a preferential groove 56 may be provided in the plate adjacent the common portion 53 of the main runner, which merges into the diagonal groove 54 and tends to guide the flange of a current collector approaching the intersection from the end of the section 53 and traversing the trolley frog, in the direction of the branch runner 55.

Referring to Figs. 4 and 6, it may be seen that the trolley frog 60, which is also a left-hand trolley frog having main runner sections 52 and 53 on a plate 51 with a branch runner 55 on the left hand side, is disposed to be preferential for taking to the straight or along the main runner 52. This result is obtained by having a groove 61 in the plate 51 adjacent the common portion of the main runner 53 which is directed along the main runner instead of merging into the diagonal groove 64. Accordingly, the flange of a current collector traversing the trolley frog from the direction of the section 53 will be caught in the groove 61, and the current collector will be preferentially directed along the main runner. The trolley frogs illustrated in Figs. 3 and 4 are both left-hand frogs and represent taking to the curve, and taking to the straight trolley frogs. Right-hand trolley frogs are substantially similar in all respects to left-hand trolley frogs, such as described hereinbefore, except that the branch runners are on the opposite side.

Referring to Fig. 7, the reference numeral 68 may denote, generally, a turnback loop for a trolley conductor system wherein trolley buses which proceed along one side of the street using the conductors 69 in a direction from right to left as shown by the arrows may be transferred to the trolley conductors 70 on the opposite side of the street for making the return trip in the direction proceeding from left to right. For example, the vehicle may pull past a turnout utilizing a pair of right-hand trolley frogs 72 grooved for taking to the curve, and into which it may back so that the current collectors are switched onto the conductors 74 and proceed in reverse through a crossing 75 with the trolley conductors 70 in a direction shown by the dotted arrows and into a turnout 78 of the Y design similar to that described in connection with Fig. 1 of the drawings. In this instance the trolley frog 79 may be a left-hand trolley frog similar to that shown and described in connection with Fig. 4 of the drawings, and which is grooved for preferential taking to the straight or to the main runner. The trolley frog 80 may be a right-hand trolley frog grooved for taking to the curved or branch runner in a manner similar to that described in connection with the left-hand trolley frog shown in Fig. 3. By utilizing such an arrangement of trolley frogs, the vehicle need only back into the Y construction 78 and then proceed forward along the conductors 82 through a turnout utilizing left-hand trolley frogs 83 which need not be grooved preferentially since they are used in trailing operation only, whereupon it is transferred to the trolley conductor 70 for making the return trip.

Referring to Fig. 8, the reference numeral 85 denotes, generally, a modified form of turnback loop for effecting a transfer between the conductors 69 on one side of the street and the conductors 70 on the other. In this instance, the trolley bus proceeds in a forward direction through a turnout utilizing trolley frogs 86 which may be electrically operated since they are to be selective in operation, and over a crossing 87 into a Y construction 88. The right-hand trolley frog 90 may, in this instance, be grooved for taking to the straight or main runner, while the left-hand trolley frog 92 may be grooved for preferential taking to the curved or branch runner. The vehicle merely proceeds through the Y in the forward direction, then reverses and back along the conductors 94 and through a turnout utilizing trolley frogs 95 which may be left-hand frogs grooved for preferential taking to the straight or main runner, and onto the trolley conductors 70, whereupon it is in the position to make the return trip.

From the above description and the accompanying drawings, it will be apparent that I have provided, in a simple and effective manner, for producing a practical and economical overhead trolley conductor construction. Instead of requiring special designs of trolley frogs in each one of a number of different applications, left- and right-hand trolley frogs which are well-known designs, both fixed and electrically operated, and both preferentially grooved and otherwise such as are used in the usual turnouts or intersections, may be used with extremely satisfactory results. By utilizing a closed box construction in the design of the turnout, and connecting the rigid curved sections intermediate their ends to the trolley crossing, a simple and inexpensive design is provided which is extremely rigid and yet light in weight. The use of an adjustable insulating member for closing the box construction at the branch end of the Y permits a ready equalization of the different strains encountered in installing such a construction, and provides for aligning it for the maximum operating conditions.

Since certain changes may be made in the above-described construction, and different embodiments may be provided without departing from the spirit and scope thereof, it is intended that all of the matter contained in the above description and shown in the accompanying drawings shall be considered as illustrative and not in a limiting sense.

I claim as my invention:

1. A substantially symmetrical Y construction for an overhead trolley conductor system comprising, a pair of substantially straight conductor sections forming the stem, a pair of branch conductor sections intersecting from the right side, another pair of branch conductor sections intersecting from the left side, and a pair of trolley frogs connecting the straight and branch conductor sections having main runners extending between the straight conductor sections and the outer conductors of the pairs of branch conductor sections, and oppositely disposed branch runners angularly related to the main runners and positioned in line with the inner conductors of each of the pairs of branch conductor sections.

2. A substantially symmetrical Y turnout for a trolley conductor system comprising, a pair of substantially rigid pairs of spaced apart curved conductor sections intersecting with each other substantially symmetrically about a central axis, and a pair of turnout trolley frogs, one left-hand and the other right-hand, positioned at the intersections having substantially straight main runners in alignment with the outer sections of the pairs of curved conductor sections and inclined slightly inwardly of the central axis, and oppositely disposed branch runners angularly related therewith in alignment with the inner conductor sections of the pairs of curved conductor sections.

3. A symmetrical Y construction for a trolley conductor system comprising, a pair of substantially straight stem conductor sections positioned in spaced relation, a pair of spaced branch conductor sections intersecting with the straight conductor sections from the right, another pair of spaced branch conductor sections intersecting with the straight conductor sections from the left, and a pair of dissimilar trolley frogs positioned at the intersections between the straight and branch conductor sections comprising one right-hand frog and one left-hand frog each having a main runner positioned between one of the straight conductor sections and the outer conductor section of a branch pair and inclined inwardly about 3 degrees from the line of the straight conductor section, said trolley frogs having oppositely disposed right-hand and left-hand branch runners respectively, angularly related to the main runners and positioned in alignment with the inner intersecting branch conductor sections.

4. In a preferential Y turnout for changing the direction of a vehicle in a trolley conductor system, a pair of conductor sections forming a stem of the Y, two pairs of angularly related left-hand and right-hand branch conductors substantially symmetrically disposed on opposite sides of the stem and intersecting at common left-hand and right-hand points with the left-hand and right-hand stem conductor sections respectively, a trolley frog positioned at the right-hand intersection with the stem having a main runner positioned between the stem and the outer one of the left-hand branch conductors and a right-hand branch runner positioned between the stem and the inner one of the right-hand branch conductors, and a trolley frog positioned at the left-hand intersection having a main runner and an angularly related left-hand branch runner, one of said frogs being preferential for taking to the branch runner and the other being preferential for taking to the main runner.

5. A Y turnout for reversing the direction of travel of a vehicle in a trolley conductor system comprising, a pair of spaced conductor sections forming a stem, two pairs of spaced inner and outer branch conductor sections intersecting with the stem at common points and positioned on opposite sides of the stem substantially symmetrically thereof, and a pair of dissimilar trolley frogs comprising one right-hand and one left-hand frog having main and branch runners positioned at the intersections with the main runners between the stem sections and the outer sections of the branch conductor inclined inwardly on the order of 1–5 degrees from the stem sections, and oppositely disposed branch runners in line with the inner branch conductor sections.

6. A preferential Y turnout for a trolley conductor system comprising, two pairs of branch conductor sections intersecting substantially with a common stem conductor section, each of said pairs including inner and outer branch sections, a trolley frog positioned at the intersection with one of the stem sections having a plate with a substantially straight runner extending between the stem section and the outer conductor section of one branch pair at an angle to the stem section in the direction of the outer conductor section and having an angularly related branch runner in alignment with the inner conductor section of the other pair, and another trolley frog positioned at the intersection with the other stem section having a plate with a substantially straight main runner extending between the stem section and the outer conductor section of the other pair at an angle to the stem section in the direction of said outer conductor and an angularly related branch runner aligned with the inner conductor of said one pair, one of said trolley frogs having a groove in the plate for preferentially guiding a current collector from the stem section onto the branch runner and the other having a groove for preferentially guiding a current collector along the main runner.

7. A substantially rigid Y intersection for a trolley conductor system comprising, a pair of dissimilar trolley frogs having main runners with oppositely disposed right-hand and left-hand branch runners, insulating means positioning the trolley frogs with the main runners inclined toward each other on the order of 3 to 5 degrees and the branch runners on the outer side thereof, a trolley crossing, substantially rigid curved runner means connecting the main runners to the crossing, means including a pair of rigid curved conductor sections connected to the branch runners to form portions of the branch sections of the Y and having pull-off means intermediate the ends on the convex side connected adjacent the ends of the sections by tangential strain members, insulating means connecting the pull-off means in spaced relation to the trolley crossing, curved conductor sections connected to the trolley crossing at one end, insulating means connecting the other ends of the curved conductor sections in spaced relation to the free ends of the rigid curved conductor sections, and adjustable insulating means connecting said other ends of the curved conductor sections to each other.

8. The combination with two pairs of trolley conductors for supplying electrical energy to trolley buses traveling in opposite directions, of a Y turnout comprising, a 45 degree turnout from one pair of conductors in one direction, a 45 degree turnout from the other pair of conductors and on the same side thereof but in the opposite direction, a 45 degree intersection between the second turnout and the first pair of conductors, and a 90 degree Y having intersecting branch pairs of conductors aligned with the turnouts with a pair of dissimilar trolley frogs at the intersection having main runners substantially in line with the outer conductors of each branch section, and oppositely disposed left-hand and right-hand branch runners in alignment with the inner conductors of each branch, respectively.

RAYMOND P. HANNA.

REFERENCES CITED

The following references are of record in the file of this patent:

UNITED STATES PATENTS

| Number | Name | Date |
|---|---|---|
| 439,746 | Emmet | Nov. 4, 1890 |
| 721,529 | Ward | Feb. 24, 1903 |
| 1,465,308 | Matthes | Aug. 21, 1923 |
| 2,053,558 | Holden et al. | Sept. 8, 1936 |
| 2,146,705 | Atkinson et al. | Feb. 14, 1939 |
| 2,195,733 | Matthes | Apr. 2, 1940 |
| 2,235,961 | Holden | Mar. 25, 1941 |
| 2,239,582 | Wahlberg et al. | Apr. 22, 1941 |
| 2,295,400 | Hanna | Sept. 8, 1942 |
| 2,325,788 | Matthes | Aug. 3, 1943 |
| 2,345,118 | Hanna | Mar. 28, 1944 |
| 2,354,869 | Matthes | Aug. 1, 1944 |
| 2,359,437 | Matthes | Oct. 3, 1944 |